United States Patent [19]

Oh

[11] Patent Number: 5,044,854
[45] Date of Patent: Sep. 3, 1991

[54] FASTENING DEVICE IN THE FORM OF DIVIDED WASHER SECTIONS WITH GUIDE WIRE

[76] Inventor: Jung Ho Oh, 91-265, Shinsu-dong, Mapo-ku, Seoul, Rep. of Korea

[21] Appl. No.: 160,304

[22] Filed: Feb. 25, 1988

[30] Foreign Application Priority Data

Jan. 31, 1987 [KR] Rep. of Korea ............... 87-755

[51] Int. Cl.$^5$ .................. F16B 37/08; F16B 43/00
[52] U.S. Cl. ...................... 411/344; 411/432; 411/999
[58] Field of Search .............. 411/340, 344–346, 411/432, 433, 999, 540, 973

[56] References Cited

U.S. PATENT DOCUMENTS

| | | | |
|---|---|---|---|
| 1,493,197 | 5/1924 | Hall | 411/999 X |
| 1,521,024 | 12/1924 | Hubener | 411/344 |
| 1,521,025 | 12/1924 | Hubener | 411/344 |
| 1,521,026 | 12/1924 | Hubener | 411/344 |
| 1,878,579 | 9/1932 | Gober | 411/340 |
| 1,993,391 | 3/1935 | Weaver, Jr. | 411/999 X |
| 2,301,135 | 11/1942 | Molat | 411/345 |
| 2,676,509 | 4/1954 | Graham | 411/433 |
| 3,038,366 | 6/1962 | Hindman | 411/433 |
| 3,244,056 | 4/1966 | Kern | 411/340 |
| 4,082,468 | 4/1978 | von Base | 411/432 X |
| 4,274,323 | 6/1981 | Resnicow | 411/427 X |

FOREIGN PATENT DOCUMENTS

| | | | |
|---|---|---|---|
| 400409 | 2/1967 | Australia | 411/344 |
| 898794 | 4/1972 | Canada | 411/433 |
| 1206230 | 8/1959 | France | 411/433 |
| 1536344 | 7/1968 | France | 411/433 |
| 866646 | 4/1989 | Rep. of Korea . | |
| 524399 | 8/1940 | United Kingdom | 411/433 |

Primary Examiner—Lloyd A. Gall
Attorney, Agent, or Firm—Donald C. Feix

[57] ABSTRACT

A special kind of fastening device is disclosed. The fastening device of the present invention comprises several divided washer sections and a guide wire which are to be used in conjuction with a blind rivet or a bolt. This fastening device is used in order to place the washer on the back of a wall for fastening a bolt, etc., in the case where the said back of the wall is inaccessible in usual manner. Generally the divided washer sections are of the shape of a parallel-elliptical form or a parallelogram, and therefore, they can be passed easily through a small hole. After passing through the small hole, they can be assembled into a form of a nut, if the guide wire is pulled forward which is connecting through all the divided washer sections.

1 Claim, 6 Drawing Sheets

FASTENING DEVICE IN THE FORM OF DIVIDED WASHER SECTIONS WITH GUIDE WIRE

FIELD OF THE INVENTION

The present invention relates to a fastener in which the washer is divided into two or more sections for fastening a bolt or a blind rivet. Particularly, the present invention is applicable to the case in which the fastening nut has to be placed at the other inconvenient side of a panel, making it desirable to insert the fastening nut into a hole, the diameter of which is smaller than that of the fastening nut. Therefore, the present invention provides divided washers, each of which is inserted into the hole one by one, and then all of which are combined together to form a whole assembly before being fastened to a bolt or blind rivet.

BACKGROUND OF THE INVENTION

Conventional devices which are intended for the same use and same purpose as the device of the present invention will be described below. One method is to cut off considerable portions from opposite sides of a washer in order to pass it into a relatively smaller hole. In this case, the washer has to be elliptical, and can be made thick, but can not be made large.

Another method is to use a blind rivet to form a knot at the other side of the hole. This is accomplished by forming creases at the tip of an aluminum tube, and therefore its strength is very low, resulting in that it can not withstand against heavy loads, and its applicability is very limited.

There is a prior invention by the present applicant, which is intended to overcome the above-described disadvantages (the application of the said invention was filed under Korean Patent Application No. 86-6646). The device of this prior invention consists of two or more divided washer sections, through which a guide wire is connected. In this device, each section of the divided washer is passed through the fastening hole to the opposite side of the panel, and then, the two strands of the guide wire are pulled forward in order to make the divided washer sections get together at the head of the bolt. Therefore, this device can not perform the function of a nut, but only the original function of a washer. Further, the fastening strength of this washer is very weak, and therefore, it is liable to fall out from the head of a bolt. In order to prevent such phenomenon, an annular groove is formed on the head of the bolt, while an annular projection is formed on the washer. Further, in order to assure the sure assembling of the washer sections, a plurality of guide holes for the guide wire are required. Such complicated features of the said device pose as the main disadvantage because the manufacturing cost of the device is increased thereby.

SUMMARY OF THE INVENTION

The present invention is intended to overcome the above-described disadvantages of the devices of the prior art, and the device of the present invention consists of divided washer sections divided in the form of a cross, a star, and a square. Through such kind of division, a new kind of fastener is provided.

Therefore the object of the present invention is to provide a fastening washer which conveniently passes the joining hole, and maintains a good fastening strength after the fastening.

Another object of the present invention is to provide a fastening washer which requires only the division of the washer, and does not require other complicated provisions, resulting in that the use of the washer is made simple, and the applicability of the washer is expanded.

In using the washer of the present invention, a blind rivet can be inserted into the/through hole formed in the washer to fasten at the tip of the blind rivet, or internal threads can be provided on the hole of the washer in order to couple with a threaded bolt.

BRIEF DESCRIPTION OF THE DRAWINGS

The objects and advantages of the present invention will become more apparent by describing the preferred embodiments of the present invention with reference to the attached drawings in which.

DESCRIPTION OF THE PREFERRED EMBODIMENTS

Figure 1:
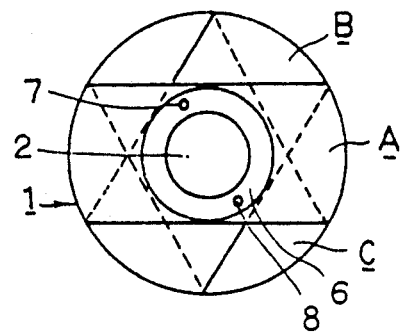
FIG. 1 is a plan view of the triple-divided washer of the present invention.
Figure 1:
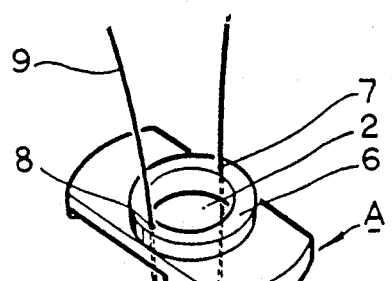

FIG. 1 shows a triple-divided washer having a through hole at the center, assembled in such a manner that an angle of 60 degrees will be formed between the respective sections of the washer, the 3 sections being indicated by A, B, and C respectively. The 3 sections of the washer 1 have an equal-sized through-hole 2 at the center thereof respectively. The first washer/section A and the second washer/section B have a thickness almost equal each other, while the third washer/section C has a thickness as big as double the washer sections A and B. The upper face of the second washer section B is provided with a passage/3 in a skew of about 60 degrees, and the width of the passage 3 is of the size enough to receive another washer section. The third washer section C is provided with a lower passage/4 and an upper passage/5 in the form of a step, and these passages cross each other forming an angle of about 60 degrees between them.

Figure 2:
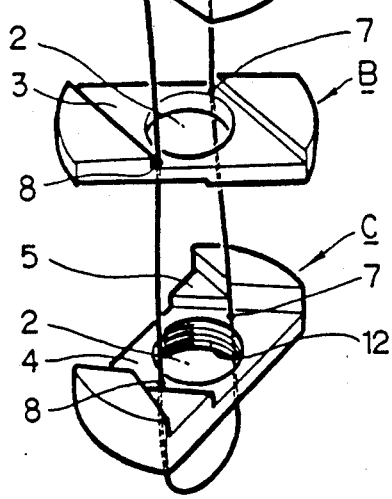
FIG. 2 is an exploded perspective view of the triple-divided washer through which a guide wire is connected.

Therefore, the 3 washer sections A, B, and C are combined in an overlapping manner, in such way that the second washer section B is received into the lower passage 4 of the third washer section C, while the first washer section A is received into the upper passage 5 of the third washer section C. In this assembled state, small holes 7 and 8 are drilled at the opposite points on the top of a projected flange 6 in a vertical direction through all the three pieces of the washer sections. A guide wire/9 is inserted through the holes 7 and 8 from below in order to form the connected state as shown in FIG. 2. Therefore if only the guide wire is pulled, the 3 washer sections A, B, and C are combined together making a complete circle in a plan view, because the small holes 7 and 8 have to be aligned upon pulling of the guide wire 9.

The guide wire 9 has to be made of a metal which has a high tensile strength and a good flexibility, or its equivalent. In other words, the guide wire 9 has to be strong and flexible enough to withstand against a forceful pulling, after the washer sections have been passed through the joining hole 10' which is formed through a panel wall 10.

Figure 6:
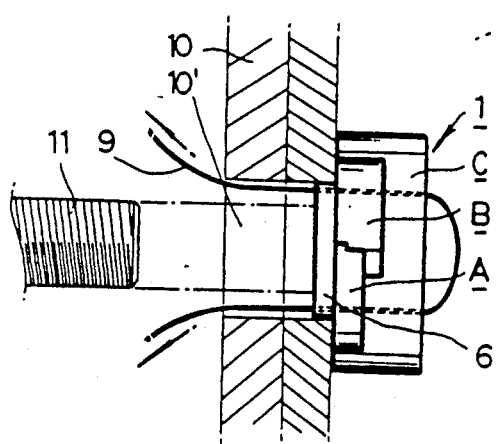
FIG. 6 shows a state in which the assembled washer is pulled onto the opposite entrance of the joining hole by means of the guide wire, and the fastening bolt is about to be inserted into the joining hole.
Figure 7:
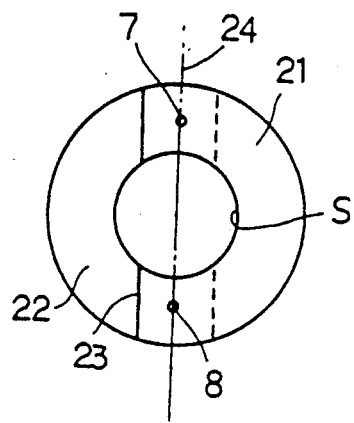
FIG. 7 shows another embodiment in which the washer is divided into two parts.
Figure 8:
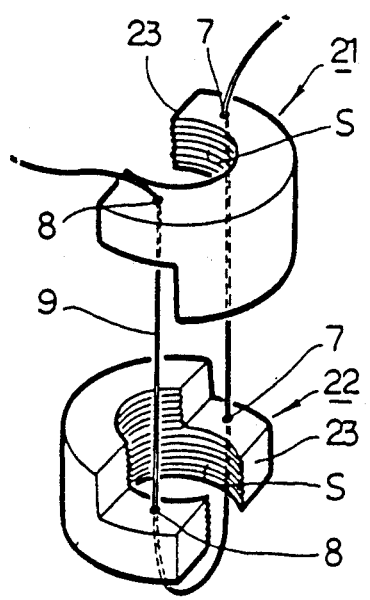
FIG. 8 is an exploded perspective view of the device of FIG. 8.
Figure 9:
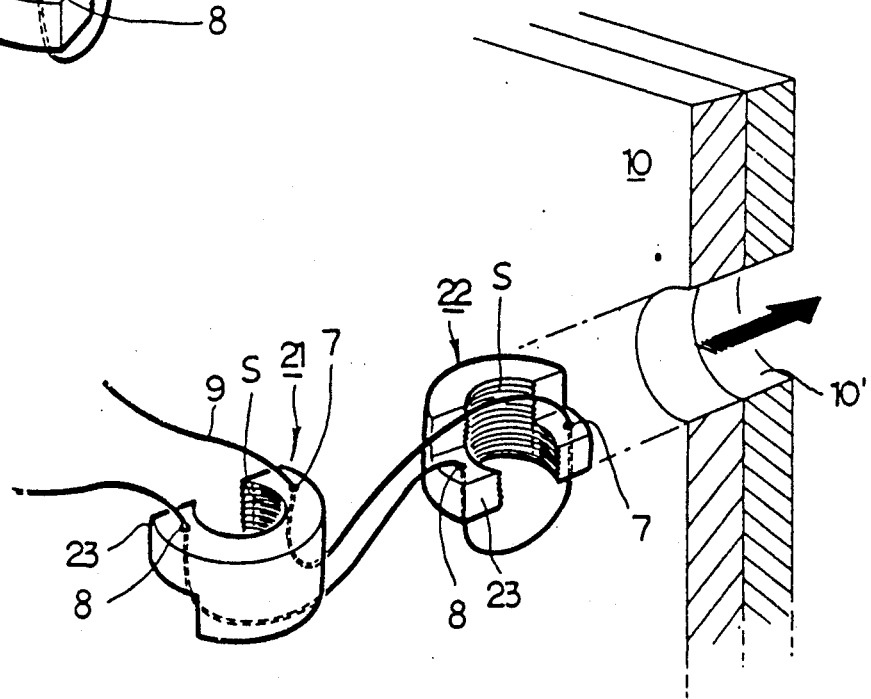
FIG. 9 shows the process of inserting the device of FIG. 7 into the joining hole.

Because the 3 washer sections A, B, and C commonly have the through hole, 2, they can be used with a blind rivet. Alternatively, if the third washer section C locating at the backmost position is provided with inner thread 12 in its through hole 2, then the washer 1 can perform the function of a nut, making it possible to fasten to a bolt 11 as shown in FIG. 6.

FIGS. 7 to 11 show another embodiment of the present invention, in which the washer 1 is provided with a divided hole S, the division being made in an L-type contour, and thereby, two symmetrical washer sections 21 and 22 are formed. Here the dividing line 23 deviates from the centre line 24 of the through hole 2.

Figure 10:
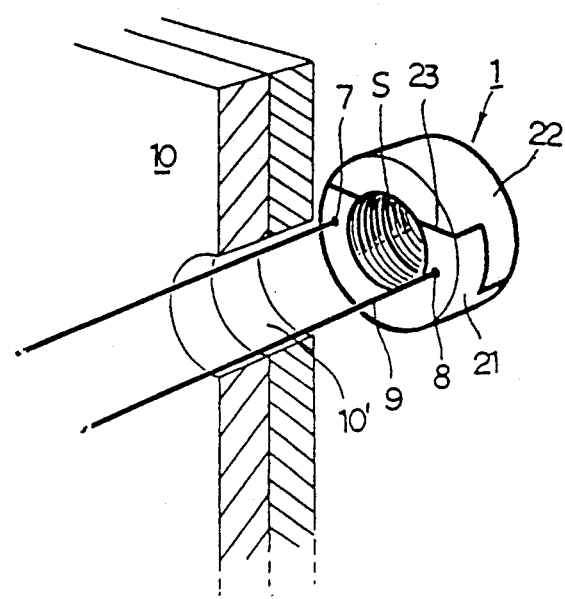
FIG. 10 shows the cylindrical shape of the washer after being assembled by pulling the two strands of the guide wire.
Figure 11:
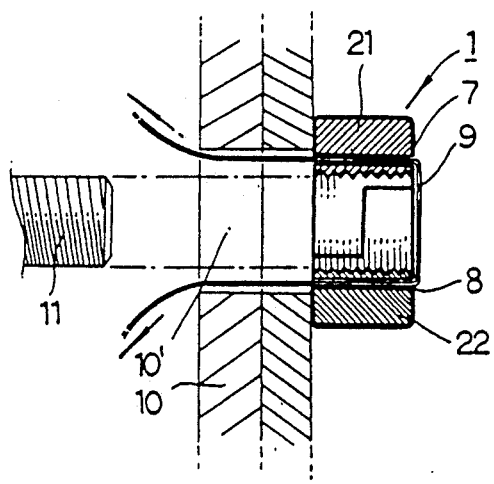
FIG. 11 shows a state in which the assembled washer is secured onto the opposite entrance of the joining hole, and the fastening bolt is about to be inserted.

In a state in which the two washer sections 21 and 22 combined together, if two small holes are drilled at positions equi-distant from the centre line 24 in the longitudinal direction, and a guide wire 9 is passed through these holes, the two sections can be assembled together in a stacked together relation. If the two strands of the guide wire 9 are pulled out, the said two sections 21 and 22 are combined in the form of a square as shown in FIG. 10. When the two sections are combined together, they form a perfect cylinder, and the divided centre hole S combines symmetrically. Therefore, there is no apprehension that the two sections 21 and 22 may spread out, when the bolt 11 is threadably coupled to the assembled washer. Another advantage of this embodiment is that it can have a joining hole much smaller than that of the embodiment of FIG. 3.

Thus, as described above and as shown in the drawing FIGS. 1-16, the present invention provides a fastening device which comprises a plurality of divided washer sections constructed for engagement with the back side of a wall after the washer sections have been inserted through a joining hole formed in the wall. Each washer section has a first planar surface for engagement with the back side of the wall and a second planar surface opposite said first planar surface. Each washer section has a recess formed in the surface of the washer section which faces an adjacent washer section. Each recess has a configuration which does two things. The recess configuration permits adjacent sections to be assembled in stacked together relation such that the first planar surfaces are aligned in the same plane for engagement with the back side of the wall. The recess configuration also permits the adjacent washer sections to be interlocked against relative rotation and lateral movement when the sections are assembled in stacked together relation. Each washer section has a first guide wire fastening hole and a second guide wire fastening hole. And the first and second guide wire fastening holes are located to be respectfully aligned with a first and a second guide wire hole of an adjacent washer section when the washer sections are assembled in stacked together relation. A guide wire for connecting the washer sections passes through the guide wire fastening holes. The guide wire serves as an alignment wire for assembling the washer sections into an integral short cylindrical form engaged with the back side of the wall after the washer sections have been inserted through the joining hole in the wall. By pulling the guide wire forward, the separated washer sections are combined overlappingly into a short cylindrical form. The assembled form has a planar, circular contact surface engaged with the back side of the wall, and the assembled washer sections are interlocked to form an integral washer assembly against the back side of the wall in the area of the wall extending around the periphery of the joining hole.

This provides a substantially large contact surface with the back side of the wall to insure substantial fastening strength, and the engagement of first planar surfaces of each washer section with the back side of the wall in a single plane distributes the fastener load substantially uniformly over the entire circular area of the wall which is engaged by the assembled washer form.

Figure 12:
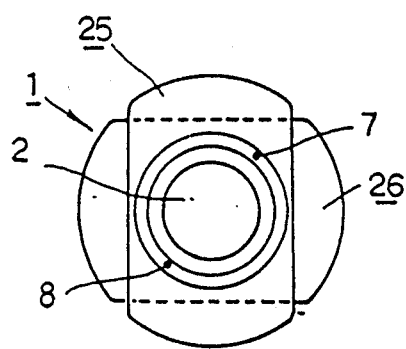
FIG. 12 shows a plan view of the washer in still another embodiment, in which the division of the washer is made in two sections, and the assembly is made in the form of a cross.
Figure 13:
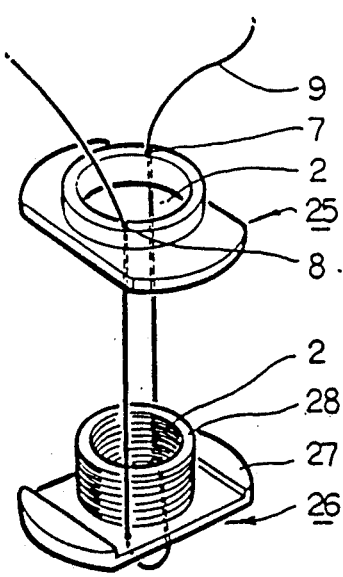
FIG. 13 is an exploded perspective view of the device of FIG. 12.
Figure 14:
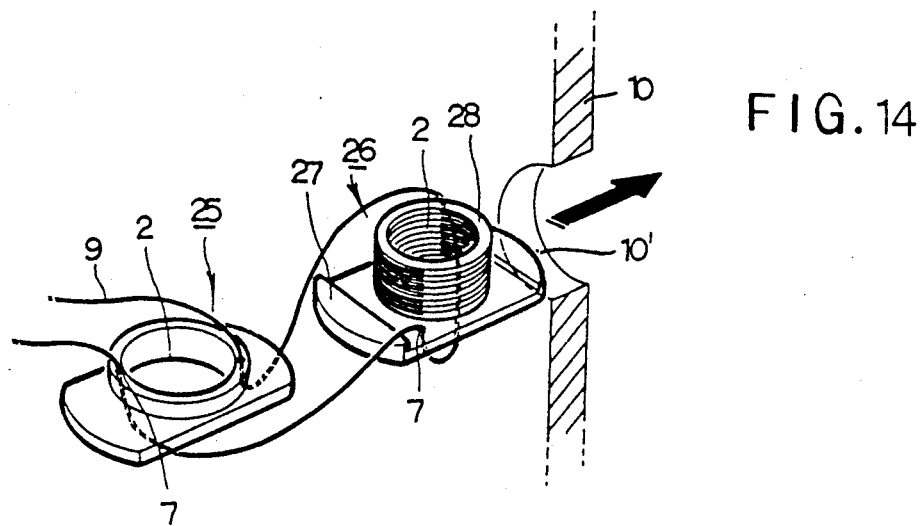
FIG. 14 shows the process of inserting the washer of FIG. 12 into the joining hole.
Figure 15:
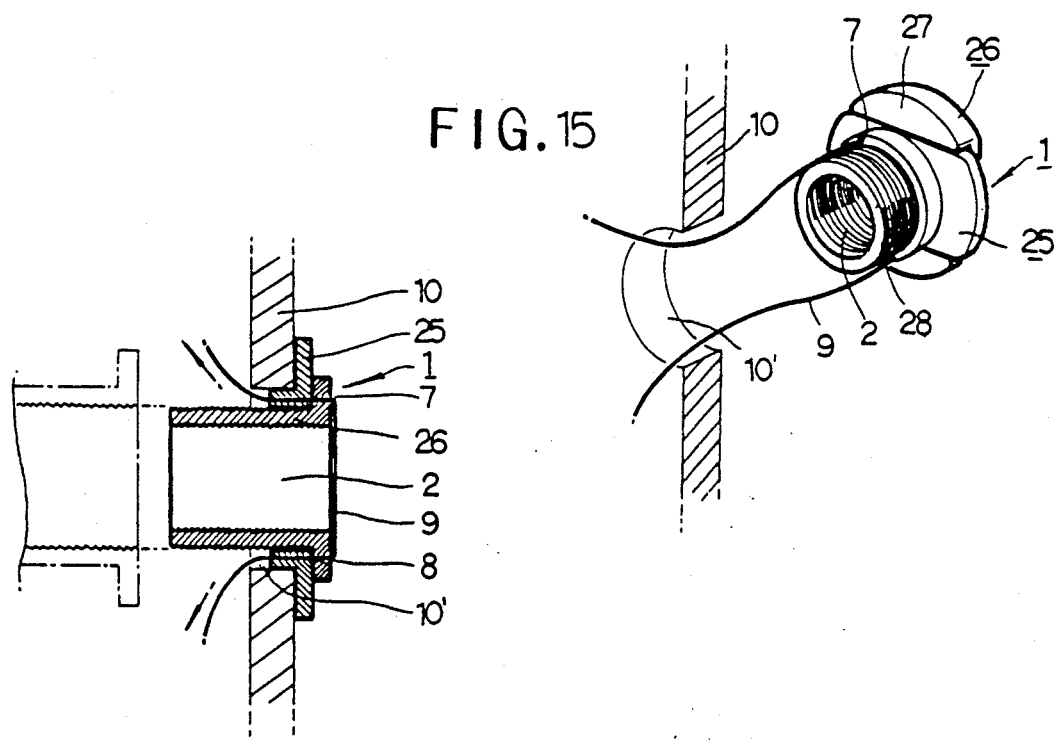
FIG. 15 shows the assembled state of the washer after being inserted through the joining hole.
Figure 16:
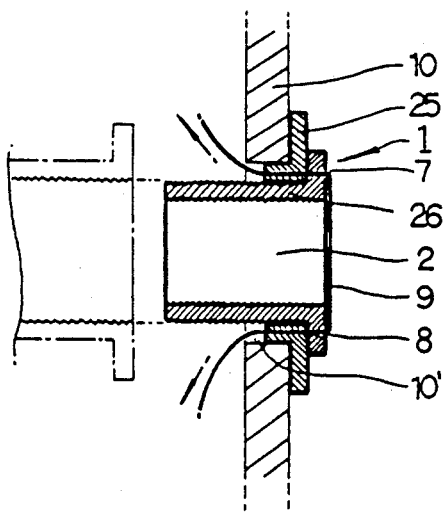
FIG. 16 shows a state in which a tube is about to be coupled to the joining socket of the washer while the two strands of the guide wire are being pulled forward.

FIG. 12 shows still another embodiment in which the washer sections are combined in the form of a cross, and the washer 1 is divided in the transverse direction in such manner that the through hole 2 is not divided but preserved. Thus the washer 1 is composed of an upper and lower washer sections 25 and 26 which are overlappingly combined. These washer sections 25 and 26 are provided with a through hole 2 respectively. Each section has a shape having two parallel sides and two elliptical sides. and the lower washer section 26 is provided with steps/27 which engage the parallel sides of the section 25 in order to prevent the pivoting of the upper washer section 25 relative to the lower washer section 26.

the lower washer section 26 is integrally provided with a protruded socket tube 28 on which inner and outer threads are provided. Therefore, as shown in FIG. 16, not only a bolt but also a tube can be fastened to the washer. This suggests that the device of the present invention can be used for joining of conduits.

Figure 17:
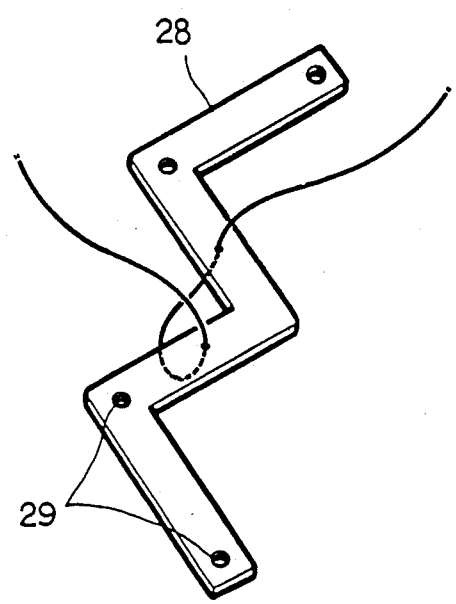
FIG. 17 is a perspective view of a zig-zag type washer in still another embodiment.
Figure 18:
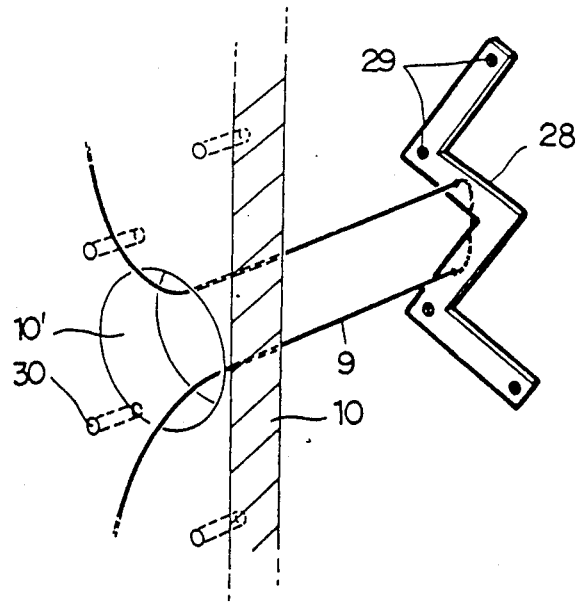
FIG. 18 shows a state in which the washer has been passed through the joining hole.

FIG. 17 shows still another embodiment in the form of a plane washer 28 which is used by attaching it on the back of a wall and fastening it from the front of the wall. For example, if a door hinge is weak in its strength, this plane washer 28 is inserted through the joining hole 10', and then fastened from the front in order to reinforce the strength of the hinge. In order to perform this operation, bolt holes 30 first have to be drilled in such manner that they should align with the fastening holes 29 which are formed on the plane washer 28.

Figure 19:
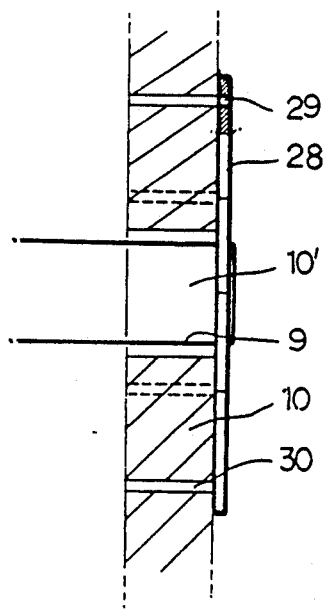
FIG. 19 shows the washer being fastened while the two strands of the guide wire are pulled forward.

The plane washer 28 through which a guide wire 9 is connected is passed through the joining hole 10' in the longitudinal posture, and then the guide wire 9 is pulled forward to make the washer 28 attached on the back of the wall as shown in FIG. 19. Keeping the pulling of the guide wire 9, the fastening holes 29 and the bolt holes 30 are aligned with each other, and then the plane washer 28 is fastened by means of bolts. This will reinforce the strength of a hinge or any kind of thin plates.

Figure 20:
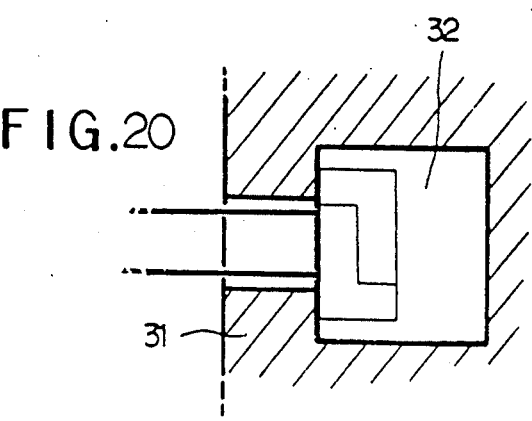
FIG. 20 shows still another embodiment in which the concrete wall is provided with a hole having a T-type cross section, and a divided washer is fastened in it.

FIG. 20 shows still another embodiment of the present invention in which a stepped hole with a T-type cross section is formed in a concrete wall, and a washer of the present invention is used to fasten with a bolt or a blind rivet. Actually FIG. 20 shows an example of the application case of the washer of the present invention. In carrying out such application, a hole/32 with a T-type cross section is drilled into the concrete wall/31 by means of a drill press, the washer sections are inserted into the hole 32 in a separated state, and the guide wire is pulled forward for the fastening of the washer.

The device of the present invention can be conveniently used when some attachment is to be provided on the outer face of a sealed tank. Because the inside of such a tank is inaccessible in usual methods, it is apparent that such a case will need the device of the present invention. Descriptions on how to use the device of the present invention will be presented below.

Figure 3:
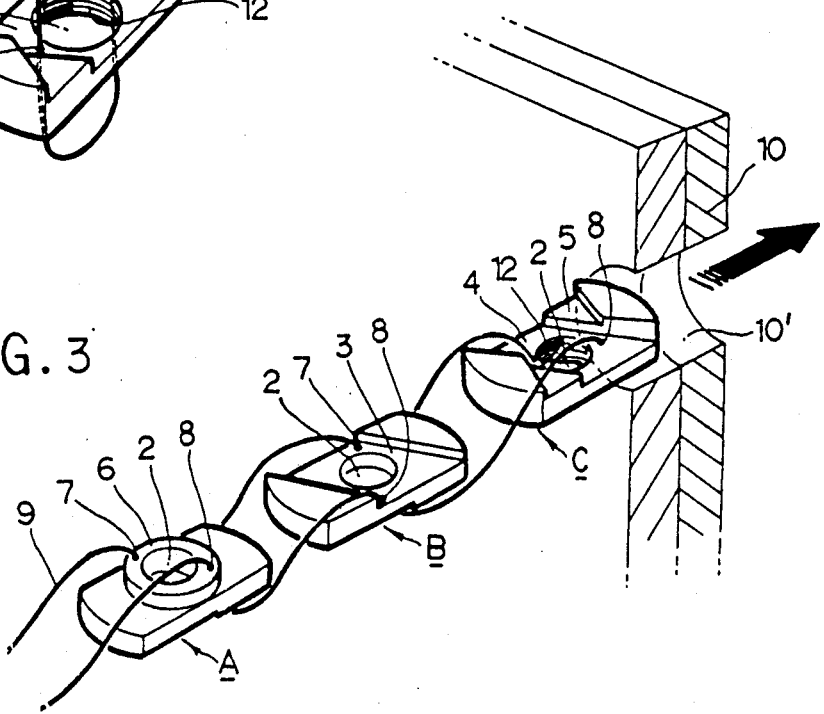
FIG. 3 shows the process of inserting the divided washer through the joining hole.
Figure 4:
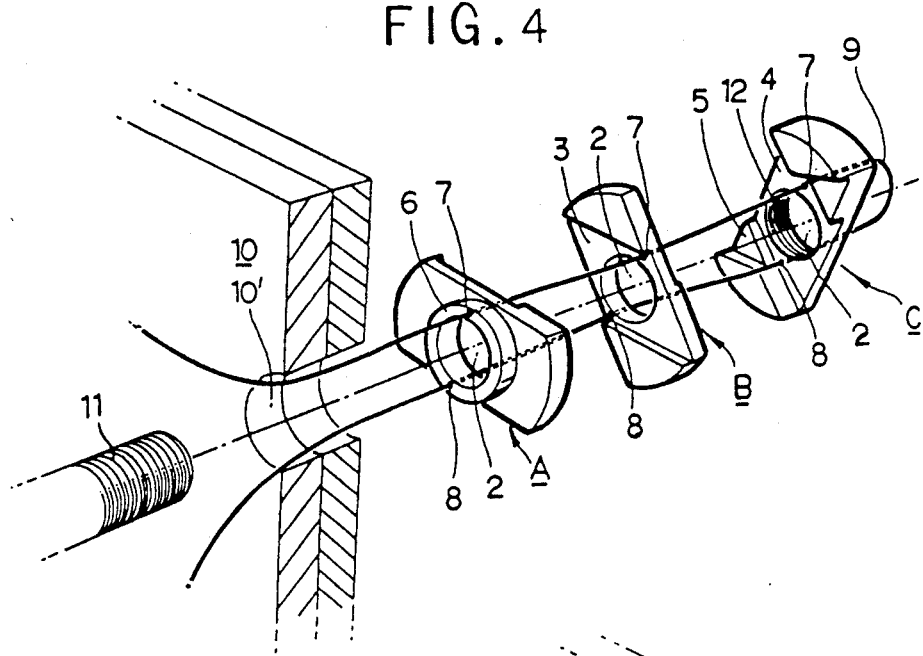
FIG. 4 shows the state of the washer sections after the insertion.
Figure 5:
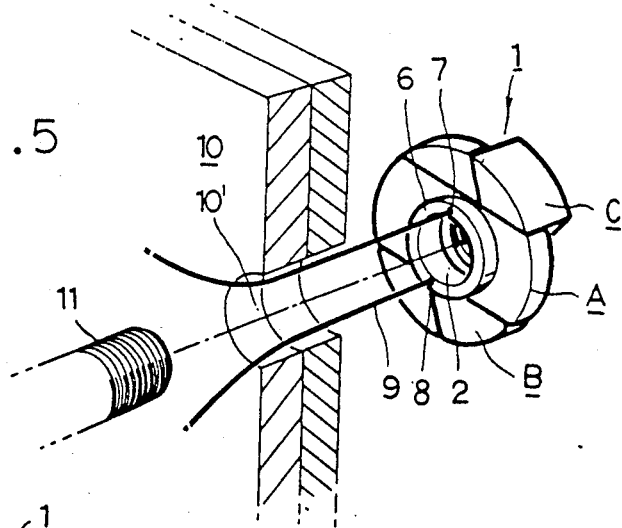
FIG. 5 shows the assembled state of the divided washer, which is formed by pulling the two strands of the guide wire.

As shown in FIG. 3, the washer sections A, B, and C are sequentially passed through the joining hole 10' of the wall 10 in the longitudinal posture. Then, if the guide wire 9 is pulled forward, the washer sections A, B, and C are combined into a cylindrical shape as shown in FIG. 5, and are closely attached onto the opposite entrance of the joining hole 10'. Then keeping the pulling of the guide wire 9, a bolt 11 is threadably fixed into the washer 1 to complete the fastening.

When inserting the bolt 11 into the joining hole 10', a plain washer is placed between the head of the bolt 11 and the front surface of the wall 10. Further it is desirable that two slots are provided at the opposite periphery of the plain washer so that the guide wire 9 could be passed through the slots. This will prevent the deflecting of the wire 9 at the periphery of the plain washer, and thus the breaking of the guide wire 9 due to the deflecting can be avoided. In consequence, repeated reuses of the guide wire 9 will be made possible.

The combination types in the form of a cross and a square will also allow the use of the same fastening procedure as that described in the above. Also instead of a bolt, a tubal socket as well as a blind rivet can be used for the fastening of the washer of the present invention.

The fastening washer of the present invention as described above may be conveniently used in attaching some object on a wall or on the external surface of a sealed tank, the inside of which is not accessible for human hands or any other tools. After passing of the separated washer sections through a joining hole, they get together as if they are slidingly installed on a single shaft, owing to their working principle. In other words, the separated washer sections, after passing of the joining hole, are combined into a short cylindrical form due to the pulling force of the guide wire.

The device of the present invention makes it possible to combine the separated washer sections to exact positions by means of a single guide wire. The device can also be conveniently used even in the cases of small bolts and nuts, and will provide great strength even in such cases. Large components can also be used with convenience, and the applicability of the device is very extensive.

It should be understood that many changes and modifications can be added to the above-described embodiments without departing from the scope of the present invention.

What is claimed is:

1. A fastening device comprising:
a plurality of divided washer sections for engagement with the back side of a wall after insertion of the sections through a joining hole formed in said wall;
each washer section having a first planar surface for engagement with the back side of the wall and a second planar surface opposite said first planar surface,
each washer section having a recess formed in the surface of the washer section which faces an adjacent washer section,
each recess having a configuration which both permits adjacent sections to be assembled in stacked together relation such that the first planar surfaces are aligned in the same plane for engagement with the back side of the wall and also permits the adjacent washer sections to be interlocked against relative rotation and lateral movement when the sections are assembled in stacked together relation,
each washer section having a first guide wire fastening hole and a second guide wire fastening hole located to be respectively aligned with a first and a second guide wire hole of an adjacent washer section when the washer sections are assembled in stacked together relation, and
a guide wire for connecting the said washer sections by passing through the guide wire fastening holes formed in the said washer sections,
and wherein the separated washer sections after passing through the joining hole are, by pulling the guide wire forward, combined overlappingly into a short cylindrical form which has a planar, circular contact surface engaged with the back side of the wall and which functions as an integral cylindrical washer.

* * * * *